Oct. 4, 1938.  E. McALPIN  2,131,962
COMBINATION LICENSE PLATE AND DIRECTION SIGNAL FOR MOTOR VEHICLES
Filed Oct. 3, 1936
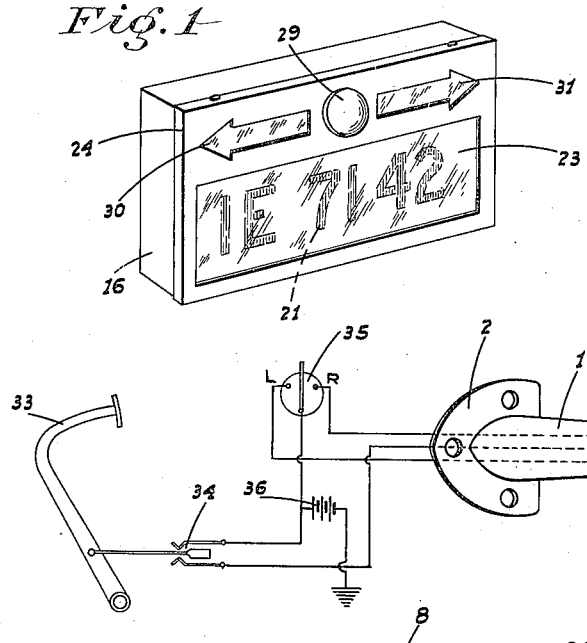
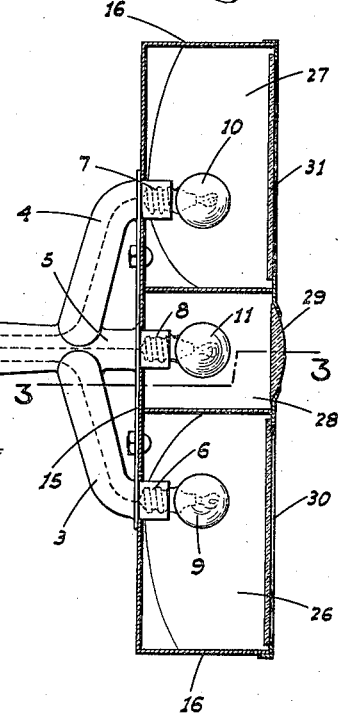
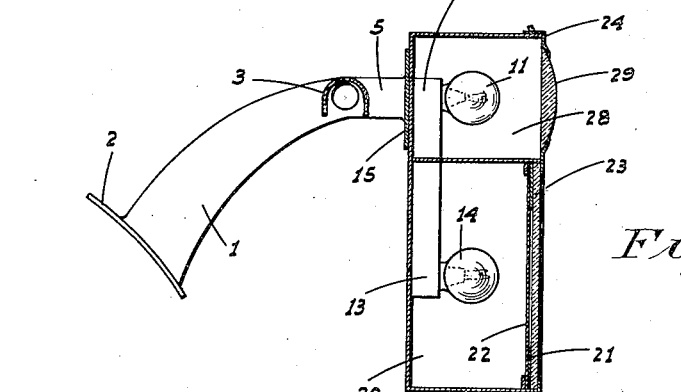
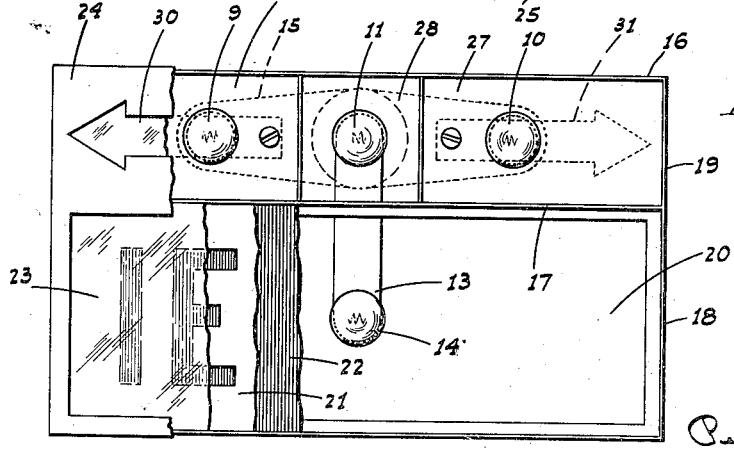
INVENTOR
E. McAlpin
ATTORNEY Patented Oct. 4, 1938

2,131,962

UNITED STATES PATENT OFFICE 2,131,962

COMBINATION LICENSE PLATE AND DIRECTION SIGNAL FOR MOTOR VEHICLES

Edd McAlpin, Lathrop, Calif.

Application October 3, 1936, Serial No. 103,876

4 Claims. (Cl. 177—329)

This invention relates to the motor vehicle art and particularly to a new and novel arrangement for a combination license plate and direction signal assembly.

The object of the invention is to produce in one simple, compact and rigid unit a combination license plate, stop light and direction signal mechanism. Broadly speaking, this object is carried out by the inclusion with a rigid supporting bracket of a four point lamp terminal arrangement incorporated with said bracket and a simple housing also rigidly mounted on said bracket and divided into four compartments, one of said compartments being provided with a facing which includes a license plate having the license number and other indicia perforated therethrough; another of said compartments carrying the stop light crystal in its front face and the other two compartments carrying open-faced arrows pointing in opposite directions to indicate, when lighted, that a right or left turn of the vehicle is to be made.

I aim by this construction to embody in one simple housing all the essential elements to provide a ready and clear vision of the license number, the stop light signals and turning signals so that the possibility of accidents, especially at night, due to a trailing or oncoming vehicle being unable to determine the movements of a vehicle ahead or to the left, will be completely obviated.

A still further object of the invention is to provide a simple and inexpensive instrumentality for the purpose which, while fulfilling all the objects of the invention, can still be mounted on a vehicle as standard equipment at nominal cost.

These objects I accomplish by such construction and relative arrangement of parts as will more fully appear in the following specification and drawing in the latter of which Figure 1 is a perspective view of the improved license plate and signal housing forming the major part of my new device.

Figure 2 is a top plan view of the completely assembled mechanism with the top part of the housing removed and showing in diagram the electrical circuits which will be used in connection with the device.

Figure 3 is a sectional view taken on line 3—3 of Fig. 2.

Figure 4 is a front plan view of the license plate and signal housing with the front plates partly broken away to expose the inner compartments and the light terminals.

Referring now more particularly to the characters of reference on the drawing, the numeral 1 designates a rigid hollow bracket member adapted to be fastened by a flange 2 to a rear fender or front frame element of the vehicle. Three hollow branches 3, 4 and 5 respectively, forming an integral and rigid part of the bracket 1, extend to three end terminations 6, 7 and 8 in each of which is formed a receptacle for the reception of the bases of signal lamps 9, 10 and 11 respectively. These receptacles or sockets may be mounted in any desired and suitable manner, as for instance that shown in Patent No. 1,757,975 dated May 13, 1930. From the central branch 5 a hollow extension 12 extends at right angles thereto to a terminal 13 forming a receptacle for the threaded reception of a signal lamp 14.

Rigidly secured on the branches 3, 4 and 5 respectively by means of a securing plate 15 is my improved housing 16 which may be made of stamped metal or any other form of material which is light and rigid. A longitudinal partition wall 17 divides the housing 16 into two parts, 18 and 19 respectively. The lower portion 18 is in the form of a hollow chamber 20 across the open face of which is mounted a metal plate 21 in the face of which are formed stencil-like letters indicating the license number and other indicia commonly used on a motor vehicle license plate such as the state and year in which the license is issued. Back of the plate 21 and behind the stencil-like letters is a sheet of material 22 which is of the color desired for any particular license plate indicia and across the face of the plate 22 is an enclosing element 23 which may be made of any desired transparent material such as glass, heavy Cellophane or the like, in order to prevent the entrance of dirt and dust into the license plate letters while at the same time allowing the same to be clearly visible.

The elements 21 to 23 inclusive may be clamped into position in the face of the housing in any desired manner, no claim being made to any specific form of such fastening means and there being shown as one illustration of such a means a cover plate 24 adapted to be secured by screws 25 to the walls of the housing.

The upper part 19 of the housing is divided into three compartments 26, 27 and 28.

In the front face of the compartment 28 is positioned the stop light crystal 29. In front of the front face of the compartment 26 is formed a transparent arrow 30 pointing to the left and in the face of the compartment 27 is formed a like transparent arrow 31 facing to the right.

It will be noted that the lamp 14 is situated midway of the compartment 20 and lamps 9 and 10 are positioned midway of the compartments 26 and 27 respectively, and the lamp 11 is midway of the compartment 28. The wiring leading from the battery of the vehicle will all project through the hollow bracket 1 and branch through the hollow elements 3, 4, 5 and 12 to extend to the respective lamps.

The wiring diagram shown in Fig. 2 will be readily understandable. When the brake lever 33 is operated, the switch 34 will function to cause the light in the compartment 28 to be illuminated and illuminate the stop light crystal 11.

When the switch 35 is turned to the left the circuit will be completed to illuminate the lamp 10 back of the arrow 30 indicating a left turn, when thrown to the right the circuit will be completed to illuminate the lamp 9 to indicate a right turn. The usual circuit from the battery 36 may be operated to turn on the parking and head lights of the vehicle which will both include within the circuit the lamp 14 so that when either the parking lights or the head lights are on this lamp will illuminate the license plate rendering the same clearly visible to officers or others who wish to identify the vehicle.

From the foregoing it will be quite apparent that my improved signal can be made useful in both making the license plate indicia clearly visible and also providing ready indication of stopping and right or left turns, and one of the devices will, of course, be installed both in the front and rear of the vehicle. The device, as will be obvious, can be made very compactly, simply and inexpensively and the novel arrangement of the combination bracket supporting means and lamp terminals will hold the signal housing against undesirable vibration and will provide a perfect conduit for the electrical wiring.

From the foregoing description, it will be readily apparent that I have produced such an instrumentality as will satisfy the objectives of the invention as set forth in the preamble of this specification.

While I have disclosed the preferred form of the invention in some specific detail, it will of course be understood that in practice various deviations from such detail may be resorted to without departing from the spirit of the invention as defined by the appended claims.

Having thus described my invention, what I claim as new and useful and desire to secure by Letters Patent is:

1. A device of the character described comprising a rigid hollow bracket, a plurality of rigid hollow branches to the bracket each terminating into a socket for an electric lamp, a housing mounted rigid with the branches and divided into compartments, each compartment embracing one of the lamp sockets, and an electrical control circuit for lamps placed in said sockets, the wires of the circuit extending through said bracket and branches.

2. Supporting means for a relatively long vehicle signal casing whose length is adapted to extend transversely of a vehicle and having compartments separated lengthwise of the casing, said means comprising a hollow rigid bracket behind the casing, hollow rigid members branching from said bracket longitudinally of the casing and projecting through the back of the casing substantially centrally of the length of said compartments to terminations in the compartments facing the front of the casing and bulb sockets mounted in the terminal portions of said members and a securing plate rigid with and extending between said members parallel to and secured against the back of the casing.

3. A signal structure comprising a relatively long signal casing provided with a central compartment and side compartments, a rigid hollow bracket projecting from within the central compartment through the back of the casing, hollow bracket-branches extending from the back of and secured to the casing adjacent the center of length of the side compartments, and bulb sockets in the casing mounted in the terminals of the bracket and branches in facing relation to the front of the casing.

4. A signal structure comprising a casing provided with upper and lower compartments, a rigid hollow supporting bracket projecting from within the upper compartment through the back of the casing, a hollow extension rigid with and depending from the bracket within the casing into the lower compartment, and bulb sockets in the casing mounted on the inner end of the bracket and the lower end of the extension in facing relation to the front of the casing.

EDD McALPIN.